United States Patent
Xie et al.

(10) Patent No.: US 6,885,791 B2
(45) Date of Patent: *Apr. 26, 2005

(54) INTEGRATED-OPTIC DEVICE AND A METHOD FOR ATTENUATING LIGHT OR EQUALIZING LIGHT USING INTEGRATED-OPTIC DEVICE

(75) Inventors: Tong Xie, Santa Clara, CA (US); Yakov Sidorin, Mountain View, CA (US); Falgun Patel, Palo Alto, CA (US); Ralph Henry Page, Castro Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,343

(22) Filed: Oct. 3, 2001

(65) Prior Publication Data

US 2003/0063831 A1 Apr. 3, 2003

(51) Int. Cl.[7] .............................................. G02B 6/34
(52) U.S. Cl. .................................... 385/37; 2/8; 2/10
(58) Field of Search ............................ 385/10, 4, 1.2, 385/7.8, 31, 37, 132; 359/237, 298, 299, 305, 333, 337.1, 337.22

(56) References Cited

U.S. PATENT DOCUMENTS

| 5,706,375 | A | * | 1/1998 | Mihailov et al. ............. 385/24 |
| 5,781,670 | A | * | 7/1998 | Deacon et al. ............... 385/10 |
| 6,181,840 | B1 | * | 1/2001 | Huang et al. ................. 385/10 |
| 6,510,167 | B1 | * | 1/2003 | Jain et al. ...................... 372/6 |
| 6,594,421 | B1 | * | 7/2003 | Johnson et al. .............. 385/37 |
| 2002/0197013 | A1 | * | 12/2002 | Liu et al. ..................... 385/37 |

* cited by examiner

Primary Examiner—Juliana K. Kang

(57) ABSTRACT

An integrated-optic attenuator/equalizer device comprising a photorefractive substrate, at least one optical waveguide channel formed in the substrate, at least one diffractive-Bragg grating formed in the substrate, and a diffractive-Bragg grating modulator that is capable of modulating the diffractive Bragg grating(s). The diffractive-Bragg grating(s) intersects the optical waveguide channel. When a diffractive-Bragg grating formed in the substrate is modulated, at least a fraction of light of a wavelength associated with the modulated diffractive-Bragg grating is re-directed by the modulated diffractive-Bragg grating, thereby preventing the re-directed fraction of light from arriving at the output of the optical waveguide channel. Multiple diffractive-Bragg gratings may be implemented in the integrated-optic device, each having a particular wavelength associated therewith, and the diffractive-Bragg gratings may be simultaneously or independently modulated to control the fractions of light of different wavelengths that arrive at the output of the optical waveguide channel.

25 Claims, 5 Drawing Sheets

INTEGRATED-OPTIC DEVICE AND A METHOD FOR ATTENUATING LIGHT OR EQUALIZING LIGHT USING INTEGRATED-OPTIC DEVICE

TECHNICAL FIELD OF THE INVENTION

The present invention relates to optics and, more particularly, to an integrated-optic attenuator/equalizer device that comprises an optical waveguide channel and at least one diffractive Bragg grating (DBG) integrated with a photorefractive material substrate.

BACKGROUND OF THE INVENTION

Optical equalizers are often used in optical wavelength division multiplexing (WDM) networks. The term "optical equalizer" simply refers to a device that receives light of multiple wavelengths and couples at least some fraction of the received light of at least one of the wavelengths out of the device in order to equalize the fractions of light of the different wavelengths remaining in the device. This equalization of fractions of light of different wavelengths is typically referred to as power equalization of optical channels, where each channel corresponds to a different wavelength of light.

Some of the functions performed by optical equalizers in WDM networks include removal of residual gain ripples in optical amplifiers and equalization of signal levels among WDM channels to optimize signal-to-noise ratio (SNR). Existing equalizer devices that have been used to perform these functions include Mach-Zender or acoustic-optical filters, holograms and MicroElectroMechanical System (MEMS) mirrors. These devices tend to operate over a large spectral range and do not provide for channel-to-channel equalization. Optical apparatuses that provide channel-to-channel equalization are typically complicated in structure and require a multiplexer, a demultiplexer and an array of equalizer devices. The demultiplexer device separates the different wavelengths of light to enable each wavelength of light to be sent to a respective equalizer device of the array of equalizer devices. The multiplexer device re-combines the equalized wavelengths of light output from the equalizer devices. The multiplexer and demultiplexer are sources of additional optical signal loss in the system, which is undesirable. Furthermore, a separate equalizer device is required for each channel being handled by the apparatus.

Accordingly, a need exists for an equalizer device that is capable of performing channel-to-channel equalization, that is relatively simple in structure, and that overcomes the disadvantages of existing optical equalizer devices, such as the necessity of using a multiplexer/demultiplexer and an array of equalizer devices to perform channel-to-channel equalization, as well as the optical losses associated with such configurations.

SUMMARY OF THE INVENTION

The present invention provides an integrated-optic device that is capable of performing equalization and/or attenuation of light. The integrated-optic device comprises a photorefractive substrate, an optical waveguide (WG) channel formed in the substrate, at least one diffractive Bragg grating (DBG) formed in the substrate and a DBG modulator for modulating the DBG(s), and a DBG modulator. The DBG intersects the optical WG channel. When the DBG is made operational by modulation of the DBG, at least a fraction of light coupled into the optical WG channel is re-directed, thereby preventing at least a fraction of the light coupled into the optical WG channel from arriving at an output of the optical WG channel.

The integrated-optic device of the present invention can be configured as an equalizer device that is capable of performing channel-to-channel equalization for multiple wavelengths of light, or it can be configured as an attenuator device that is capable of attenuating one or more wavelengths of light. In order to configure the device as an equalizer device, at least two DBGs are formed in the substrate. Each DBG corresponds to a channel and each channel corresponds to a wavelength of light. When none of the DBGs are modulated, all, or substantially all, light of all wavelengths that is coupled into the optical WG channel passes through the DBGs to the output of the optical WG channel. However, when any one of the DBGs is modulated, the modulated DBG will re-direct at least a fraction of the light of a wavelength that is phase matched to the period of the modulated DBG. The DBGs can be modulated such that the fractions of light of the wavelengths associated with the DBGs that arrive at the outputs of the optical WG channels are equal, or substantially equal.

In order to configure the device as an attenuator device, at least one DBG is formed in the substrate. When the DBG is not being modulated, all, or substantially all, light of all wavelengths that is coupled into the optical WG channel passes through the DBG to the output of the optical WG channel. However, when the DBG is modulated, the DBG will re-direct at least a fraction of the light of a wavelength that is phase matched to the period of the modulated DBG, thus attenuating the light coupled into the optical WG channel that is of a wavelength that is phase matched to the period of the DBG.

The present invention also provides a methods for performing attenuation and equalization of light input to the optical WG channel formed in the substrate of the integrated-optic device. The method for performing equalization comprises the steps of providing an integrated-optic device having at least two DBGs formed in the substrate of the integrated-optic device, coupling light into the optical WG channel, and modulating one or more of the DBGs to equalize the fractions of light of wavelengths associated with the DBGs that arrive at the output of the optical WG channel.

The method for performing attenuation comprises the steps of providing an integrated-optic device having at least one DBG formed in the substrate of the integrated-optic device, coupling light into the optical WG channel, and modulating the DBG to re-direct at least a fraction of the light of a wavelength associated with the DBG, thereby ensuring that at least a fraction of the light of a wavelength associated with the DBG does not arrive at the output of the optical WG channel.

Another advantage of using a photorefractive material for the substrate is that it makes the integrated-optic device re-writable, which means that it is re-programmable. In other words, a holographically-defined DBG that has been written into the substrate can be erased from the substrate and a new holographically-defined DBG can be written into the substrate. This feature of the present invention enables the integrated-optic device to be re-programmed so that the manner in which it operates on light, as well as the wavelength(s) of light on which it operates, can be altered. Therefore, the integrated-optic device can be programmed and re-programmed to serve different purposes, which reduces or eliminates the need to replace the device.

DETAILED DESCRIPTION OF THE INVENTION

Figure 1:
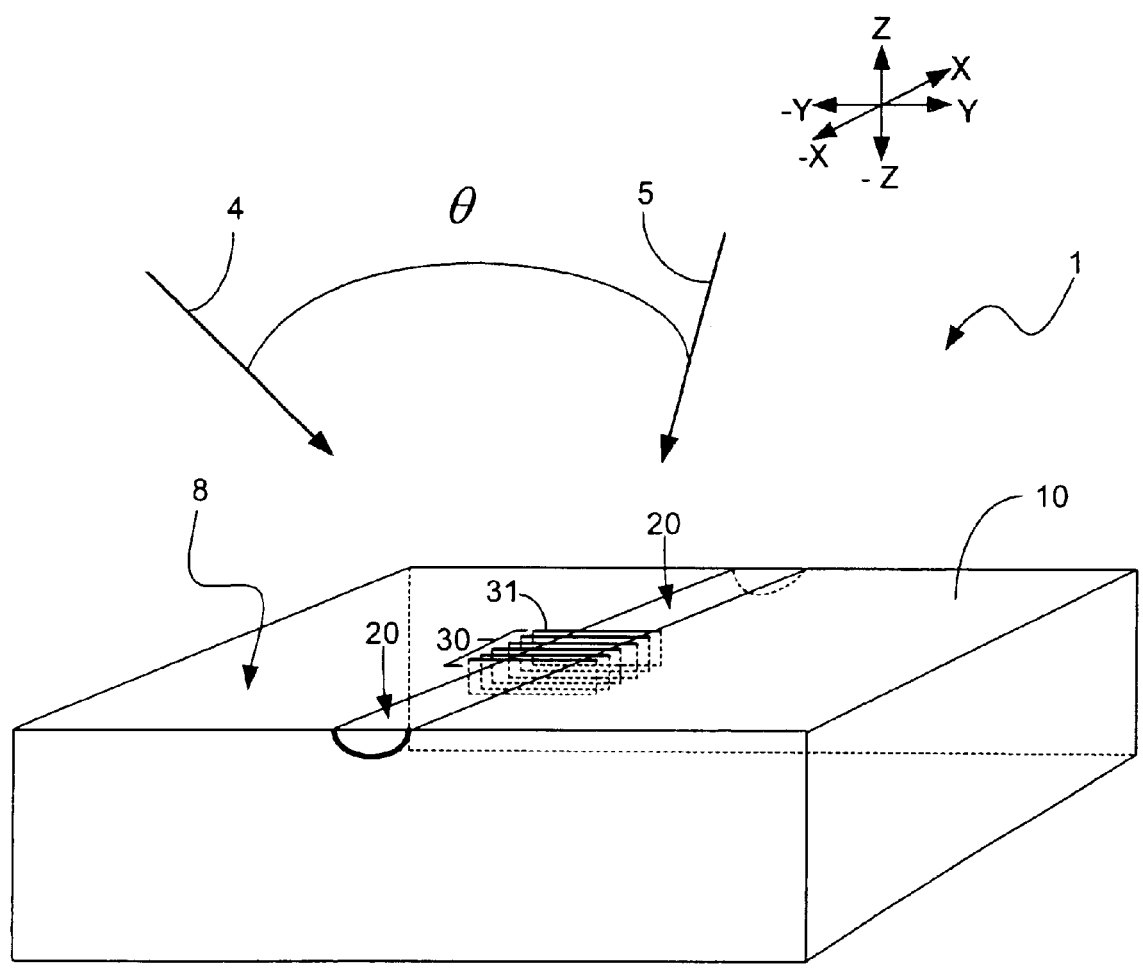
FIG. 1 illustrates a perspective view of a substrate material having an optical WG channel formed therein in which a hologram is being written in accordance with the present invention.

In accordance with the present invention, one or more holographically-defined diffractive Bragg gratings (DBGs) that are capable of being modulated are formed in a photorefractive substrate that has an optical waveguide (WG) channel formed therein. The substrate material is selected to possess properties that enable the DBG(s) to be either (1) electrically modulated, (2) thermally modulated, or (3) acoustically modulated. Therefore, each DBG is dynamically adjustable via electrical, thermal or acoustical modulation of the DBG.

Modulation of a DBG via a DBG modulator renders the modulated DBG operational for a wavelength of light that is phase matched to the period of the DBG. By modulating the DBG, the fraction of light of the wavelength associated with the DBG that is allowed to pass through the DBG to the output of the optical WG channel can be controlled. These features of the present invention enable a single device that is relatively simple m construction to be configured to operate on light of multiple wavelengths and control the fractions of light of the different wavelengths that arrive at the output of the optical WG channel. This ability to control the fractions of light of the different wavelengths that arrive at the output of the optical WG channel enables channel-to-channel equalization to be performed within a single device. By providing the ability to perform channel-to-channel equalization with a single equalizer device, the present invention overcomes the disadvantages associated with the aforementioned known channel-to-channel equalization apparatus, which requires an equalizer device for each wavelength of light (i.e., each channel) as well as a demultiplexer device and a multiplexer device.

For example purposes, the integrated-optic device will be described with respect to electrical modulation of the DBG(s), i.e., the DBG(s) will be described as being modulated by an electric field. Therefore, the DBG modulator described in detail herein will be referred to as an electric field modulator. Assuming for example purposes that the DBG(s) are to be modulated with an electric field, the photorefractive substrate material must also possess electro-optic properties (i.e., be a material characterized by non-zero electro-optical coefficients).

In accordance with the present invention, it has been determined that the known process of creating volume holograms in bulk photorefractive materials can be used to form a holographically-defined DBG in a substrate material having an optical WG channel integrated in the substrate material to produce an integrated-optic device that is capable of operating as an optical attenuator device for one or more wavelengths of light or as an optical equalizer device for equalizing multiple wavelengths of light. The present invention utilizes bulk holographic technology in conjunction with integrated-optics technology to form the fully-integrated optical attenuator/equalizer device of the present invention.

Bulk, or volume, holograms have been used for various purposes, including, for example, electric-field multiplexing, as described in a publication entitled "Eelectric-Field Multiplexing Of Volume Holograms In Paraelectric Crystals", by Balberg et al., *Applied Optics*, Vol. 37, No. 5, Feb. 10, 1998, which is incorporated herein by reference in its entirety. Other publications that discuss various aspects of volume holograms, such as their use in optical switching and storage efficiency, include, respectively, "Free-Space Optical Cross-Connect Switch By Use Of Electroholography", *Applied Optics*, Vol. 39, No. 5, Feb. 10, 2000, by Pesach et al., and "Investigation of the Holographic Storage Capacity Of Paraelectric $K_{1-x}Li_xTa_{1-y}Nb_yO_3$:Cu, V", *Optics Letters*, Vol. 23, No. 8, Apr. 15, 1998, by Pesach et al., which are incorporated herein by reference in their entireties.

The technique used for forming a DBG in a photorefractive bulk material 10 is generally as follows. With reference to FIG. 1. a beam 4 of high intensity light distribution and a beam 5 of low intensity light distribution are brought together at a certain angle θ with respect to each other in the plane 8 of the material 10 in which the hologram is to be formed. One of the beams is known as the reference beam and the other is known as the signal beam. The combination of the beams forms an interferometric picture. When the material 10 is exposed in this fashion, the photorefractive material reacts differently to the high and low light intensity distributions to which it is being exposed. In essence, the exposure causes the index of refraction within the material to change depending on the light intensity distribution, which results in refractive index gratings 30 being formed in the material. This change in the optical properties of the material is preserved for some period of time, i.e., the material stores the refractive index gratings.

When the exposure is periodic (e.g., sinusoidal), the variations in the refractive index of the material will also be periodic. These refractive index modulations result in a diffractive Bragg grating (DBG) being formed in the photorefractive material. When the photorefractive material having the refractive index gratings formed therein is exposed to a beam that is phase matched to the gratings, the beam is refracted by the gratings and the volume hologram, which is stored in the material as a spatial distribution of space charge, is reconstructed. This same technique is used to form a holographically-defined DBG in a substrate having an optical WG channel formed therein to produce the integrated-optic attenuator/equalizer device of the present invention.

The substrate material of the present invention can be any material that satisfies the criterion of being photorefractive and capable of being electrically, thermally or acoustically modulated. The meaning of the term photorefractive generally refers to the ability of the material to locally change its refractive index in response to exposure to light. The term electro-optic is intended to denote a material property that allows the refractive index of the material to change as a result of the application of a direct current (dc) or low-frequency electric field. Materials are known which meet these requirements. For example, one material that is suitable for use as the substrate of the integrated-optic device of the present invention is $K_{1-x}Li_xTa_{1-y}Nb_y O_3$:Cu, V, which is otherwise referred to in the art as "KLTN". However, as will be understood by those skilled in the art, in view of the description provided herein, other materials that meet these requirements are also suitable for use as the substrate material. Therefore, the substrate material is not limited to any particular material, except to the extent stated herein. It should also be noted that substrate materials may be doped with various ions so as to provide the integrated optic device with additional characteristics. For example, substrate materials doped with rare-earth ions (e.g., $Er^{3+}$, $Yb^{3+}$) may be used for forming an integrated-optic attenuator/equalizer device that possesses amplifying characteristics in the near-infrared (IR) spectral region.

When the integrated-optic device of the present invention is configured to operate as an attenuator, the device will comprise at least one DBG. When the DBG is modulated, at least a fraction of the light propagating along the optical WG channel is caused to be coupled out of the plane of the optical WG channel by the DBG and/or retro-reflected by the DBG (i.e., reflected back along the waveguide channel in a direction opposite to the direction of propagation prior to impinging on the DBG). The period of the DBG is phase matched to the wavelength of light to be attenuated by the DBG when it is modulated. At least a fraction of the light of this wavelength passes through the DBG and continues to propagate along the optical WG channel to the output thereof. Otherwise, the light would not be "attenuated", but rather, it would be completely filtered out and prevented from reaching the output of the optical WG channel.

When the integrated-optic device of the present invention is configured to operate as an equalizer for performing channel-to-channel equalization, the device will comprise at least two DBGs, with each DBG corresponding to a channel. In this case, when any one of the DBGs is modulated, at least a fraction of the light propagating along the optical WG channel of a wavelength that is phase matched to the period of the modulated DBG will be coupled out of the plane of the optical WG channel or retro-reflected by the modulated DBG. At least a fraction of the light of the wavelength that is phase matched to the period of the modulated DBG will pass through the DBG without being out-coupled or retro-reflected and arrive at the output of the optical WG channel.

FIG. 1 illustrates a perspective view of the integrated-optic device 1 of the present invention as it is being created. FIG. 1 illustrates the storage of information in a substrate 10 in the form of at least one holographically-defined DBG 30. The integrated-optic device 1 of the present invention comprises a substrate 10 having a WG channel 20 formed therein in the direction of the x-axis. FIG. 1 illustrates a single DBG 30 formed in the substrate 10, although this is merely for illustrative purposes. The DBG 30 intersects the optical WG channel 20. Each of the blocks 31 represents a periodic variation in the refractive index of the substrate material. The combination of these periodically-varying refractive index material layers 31 constitutes a holographically-defined DBG 30.

The blocks 31 are drawn to illustrate the intersecting of the WG channel 20 by the DBG 30. Each block 31 is shown as having a depth in the negative-z direction that is at least as deep as the depth of the WG channel 20 in the negative-z direction (i.e., in the downward direction in FIG. 1). Each block is shown as having a width in the negative y and positive y directions that corresponds at least to the width of the WG channel 20 in the negative y and positive y directions. The blocks 31 are spaced apart along the WG channel 20 in the direction of the x-axis, which is coincident with the direction of the WG channel 20. The spacing between the blocks 31 corresponds to the period of the DBG 30.

At least one DBG 30 is needed in order to couple light out of, or retro-reflect within, the WG channel 20. However, as described below with reference to FIGS. 3, 4 and 5, more than one DBG may be formed in the substrate material to create the integrated-optic device 1, depending on the characteristics that the integrated-optic device 1 is to possess. When the DBG is modulated, a waveguide mode within the phase-matching bandwidth of the DBG 30 will be operated upon by the DBG with an efficiency that depends upon the phase mismatch between the DBG and the waveguide mode. Thus, multiple DBGs formed in the substrate will generally provide a multi-wavelength region of operation of the integrated-optic device 1.

Figure 2:
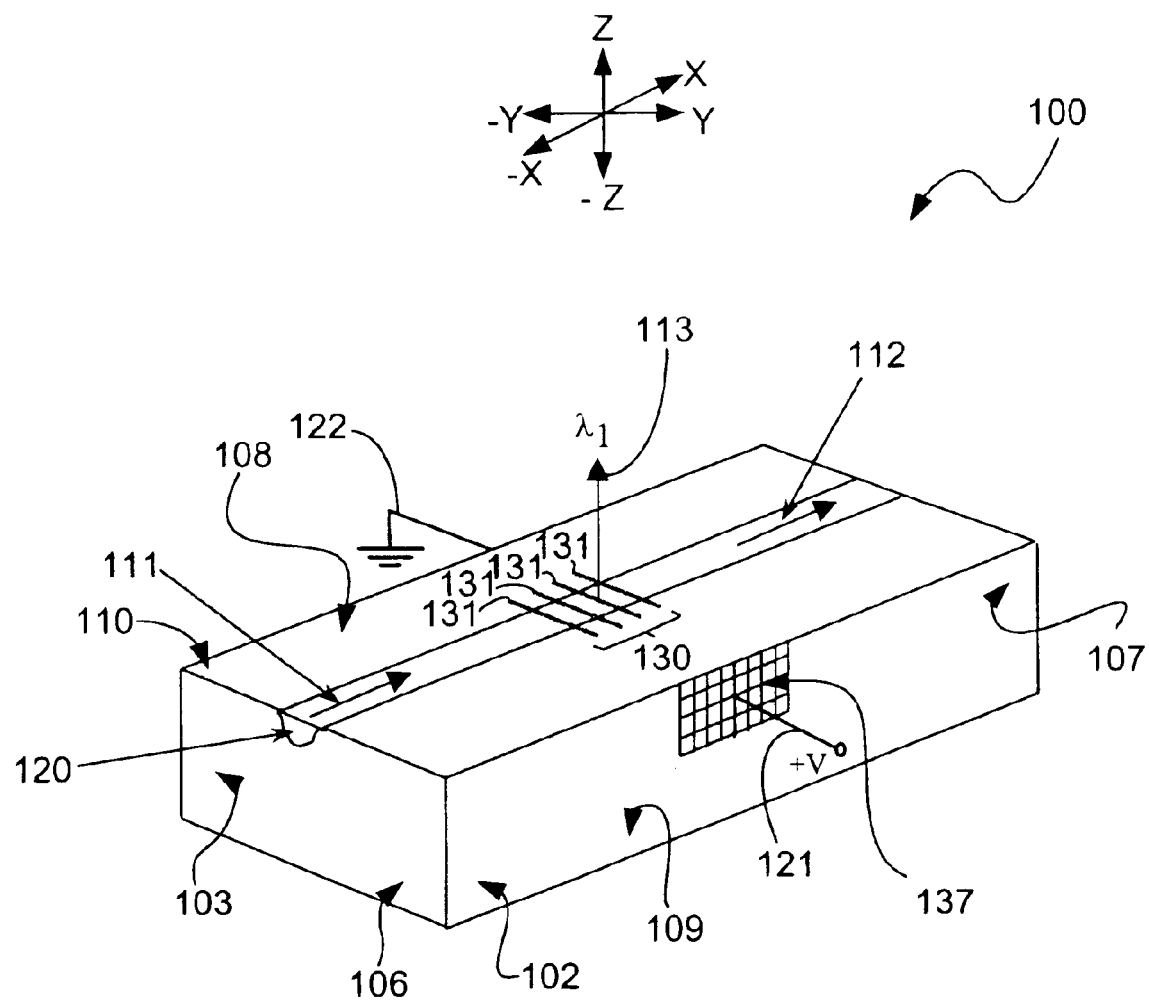
FIG. 2 is a perspective view of the integrated-optic device of the present invention that demonstrates an example embodiment in which light coupled into the optical WG channel is attenuated for one particular wavelength.

FIG. 2 illustrates a perspective view of the integrated-optic device 100 of the present invention in accordance with an example embodiment in which a single DBG 130 having a period that is phase matched to a particular wavelength of light $\lambda_1$ has been formed in the substrate 110. In this example, the integrated-optic device 100 is simply functioning as an attenuator to attenuate the light received at the input of the optical WG channel 120 (arrow 111) to cause a fraction of the light of wavelength $\lambda_1$, which is represented by arrow 113, to be coupled out of the WG channel 120, thus allowing only a fraction of light 112 of wavelength $\lambda_1$, which is represented by arrow 112, to reach the output of the optical WG channel 120. Although the re-directed fraction of light of wavelength $\lambda_1$ is illustrated as being out-coupled by the DBG 130, attenuation can be effectuated through out-coupling in the manner shown and/or by retro-reflection (i.e., reflection by the DBG 130 in a direction opposite to the direction of arrow 111).

As stated above, the integrated-optic attenuator device 100 can be dynamically adjusted to vary the fraction of light coupled out of the optical WG channel 120 by the DBG 130(or retro-reflected by the DBG 130), thereby varying the fraction of light that reaches the output of the optical WG channel 120. For example, the DBG 130 may be formed in the substrate 110 such that it has an initial "strength". The "strength" of the DBG 130, as that word is used herein, denotes the ability of the DBG 30 to couple light out of the plane of the WG channel 120 (i.e., out of the x, y plane) and/or to retro-reflect light within the WG channel 120 (i.e., in the negative-x direction). Thus, the greater the strength of the DBG, the greater the fraction of light that is out-coupled and/or retro-reflected by the DBG 130 and the smaller the fraction of light that is allowed to pass through the DBG 130 to the output of the optical WG channel 120. The strength of the DBG 130 can be varied by modulating the DBG 130.

The DBG 130 is electrically modulated when a voltage is applied to the substrate 110 via electrodes 121 and 122. Application of this voltage causes an electric field to be applied over at least a portion of the substrate 110 that includes the DBG 130 via a conductive grid-like pattern 137 formed on side 102 of the substrate 110 and connected to terminal 121 and a like conductive grid-like pattern (not shown) formed on side 103 of substrate 110 and connected to ground terminal 122. This application of an electric field to the DBG 130 causes the strength of the DBG 130 to vary, which causes the fraction of light reaching the output of the optical WG channel 120 to vary. In essence, the application of the electric field causes the refractive indices of the layers 131 of the DBG 130 to vary, which varies the manner in which the DBG 130 operates on light of the wavelength that is phase matched to the period of the DBG.

The integrated-optic device 100 shown in FIG. 2 may be configured such that, for example, when no voltage is applied, all of the light 111 coupled into the optical WG channel 120 passes through the DBG 130 to the output of the optical WG channel 120. However, when a voltage differential is created between terminals 121 and 122, the strength of the DBG 130 increases and a fraction of the light (arrow 111) coupled into the optical WG channel 120 of wavelength $\lambda_1$ is coupled out of the optical WG channel 120 (arrow 113). Thus, the fraction of light of wavelength $\lambda_1$ reaching the output of the optical WG channel 120 is reduced. Therefore, the light coupled into the optical WG channel 120 of wavelength $\lambda_1$ is attenuated by out-coupling a fraction of the light of wavelength $\lambda_1$. It should be noted that instead of the light being out-coupled, the light could be retro-reflected (not shown), depending on the design of the device 100, as discussed below in detail. In either case, the light coupled into the optical WG channel 120 is attenuated.

The adjustibility of the integrated-optic device 100 shown in FIG. 2 is possible due to the fact that the material comprising the substrate 110 is an electro-optic material in this example. This means that application of a voltage differential over the material of the substrate 110 will result in the occurrence of the photoelectric effect, which results in the difference between the refractive indices of the layers 131 of the DBG 130 being either enhanced or reduced. This enhancement or reduction of the differences between these refractive indices causes more or less light, respectively, to be out-coupled from (or retro-reflected in) the WG channel 120. Therefore, by varying the voltage applied to the device 100 via electrodes 121 and 122, the amount of light that is allowed to propagate through the device 100 to the output of the WG channel 120 can be varied. In other words, the integrated-optic device 100 is tunable.

The direction of light coupled out of the optical WG channel 120 by the DBG(s) 130 depends on a variety of parameters and conditions, including (1) the order of the DBG, (2) the distribution of the refractive indices associated with the DBG 130, with the WG channel 120 and with the substrate 110, (3) the effective refractive index of the WG mode under consideration, and (4) the wavelength of the light coupled into the optical WG channel. The direction of the fraction of light that is diffracted by the DBG(s) 130 is governed by:

$$\sin\theta_d \approx \left(\frac{2M}{p} - 1\right),$$ (Equation 1)

where an integer $$p = \frac{2\Lambda}{\lambda}$$

defines the DBG order, $\lambda$ is the effective wavelength of the waveguide mode, $\Lambda$ is the DBG period and M represents the order of diffraction.

If the order of the DBG is p=1, a fraction of the light of wavelength $\lambda$ coupled into the optical WG channel 120 will be transmitted through the DBG 130 (in the positive-x direction) and a fraction of the light of wavelength $\lambda$ coupled into the WG channel 120 will be retro-reflected back along the optical WG channel 120 (in the negative-x direction). If the order of the DBG 130 is greater than 1, a fraction of light coupled into the WG channel 120 of wavelength $\lambda$ will be coupled out of the WG channel 120 (out of the x, y plane) and a fraction of the light coupled into the WG channel 120 of wavelength $\lambda$ will propagate through the DBG 130 to the output of the WG channel 120 (i.e., in the positive-x direction). In this case, a fraction of the light coupled into the WG channel 120 of wavelength $\lambda$ will also typically be retro-reflected back along the WG channel 120 (in the negative-x direction).

Therefore, if the order of the DBG 130 is equal to or greater than 1, the device 100 can operate as an attenuator (at least one DBG used) or as an equalizer (at least two DBGs used), because in both cases the fraction of light of the wavelength associated with the DBG(s) that is allowed to arrive at the output of the optical WG channel 20 is controllable. The direction of out-coupling of light (i.e., coupling out of the x, y plane) is generally independent of the applied voltage (or other DBG modulation). Modulation of the DBG(s) generally affects only the size of the fraction (s) of light out-coupled or retro-reflected.

Figure 3:
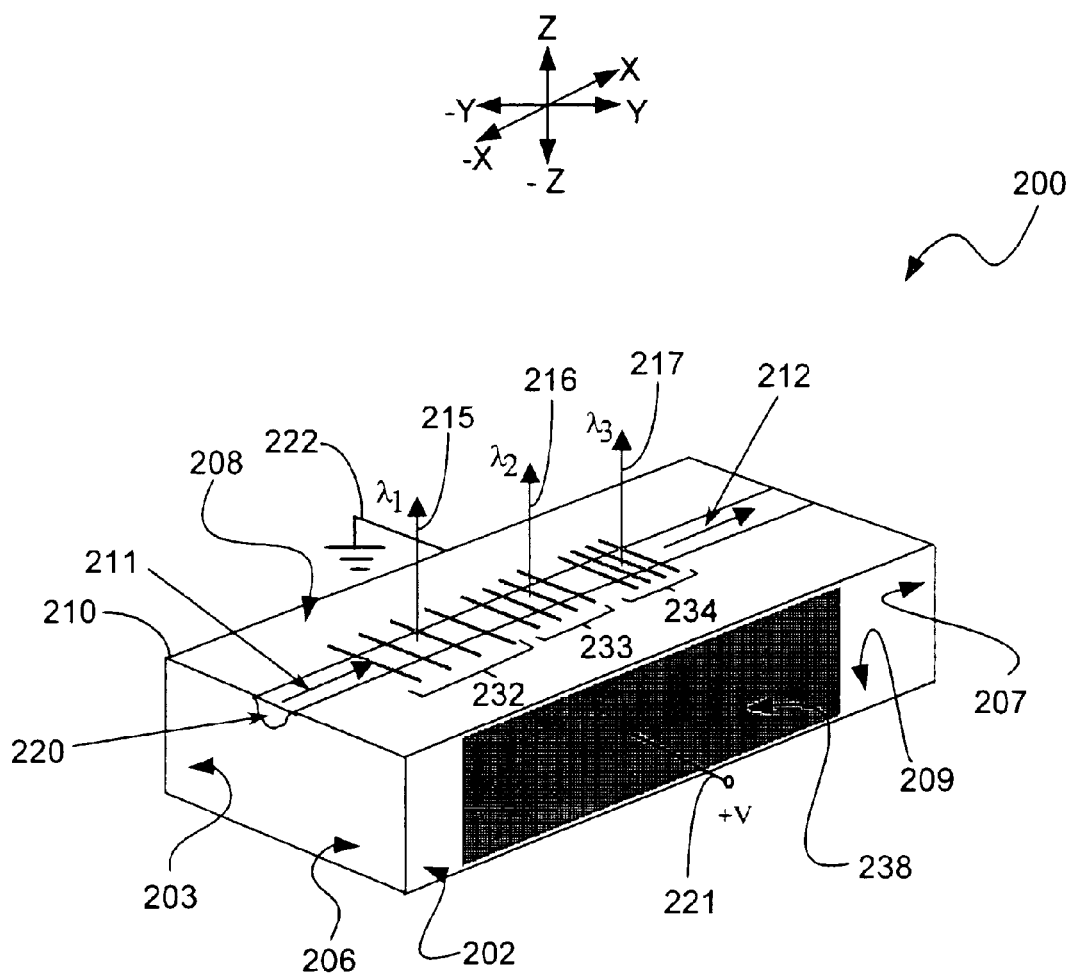
FIG. 3 is a perspective view of the integrated-optic device of the present invention that demonstrates an example embodiment in which light coupled into the optical WG channel is equalized for multiple wavelengths of light.

FIG. 3 illustrates a perspective view of an integrated-optic device 200 of the present invention in accordance with another embodiment in which the integrated-optic device 200 is configured to operate as a channel-to-channel equalizer or as an attenuator for multiple wavelengths. In this example, the device 200 has multiple channels, each of which corresponds to a respective wavelength of light, $\lambda_1$, $\lambda_2$, and $\lambda_3$. For example purposes, the device 200 is shown as having three different DBGs 232, 233 and 234 formed therein. The first DBG 232 is effective for light of wavelength $\lambda_1$ when it is modulated. The second DBG 233 is effective for light of wavelength $\lambda_2$ when it is modulated. The third DBG 234 is effective for light of wavelength $\lambda_3$ when it is modulated. In the example embodiment shown in FIG. 3, a voltage signal can be applied simultaneously to all of the DBGs 232, 233 and 234 via shared electrodes 221 and 222 to cause the strengths of the DBGs 232, 233 and 234 to be simultaneously changed. On side 202 of the device 200, the grid-like pattern 238 represents conductors that set up an electric field in the material of the substrate 210. A similar or identical grid-like pattern (not shown) is located on side 203 of the device 200 and is connected to the ground terminal 222. When a voltage signal is applied to terminal 221, the differential voltage set up between terminal 221 and ground terminal 222 generates an electric field that simultaneously affects the strengths of the DBGs 232, 233 and 234.

The DBGs 232, 233 and 234 can be formed in the substrate in such a manner that simultaneous modulation of the DBGs causes equal fractions of light of wavelengths $\lambda_1$, $\lambda_2$ and $\lambda_3$ to arrive at the output of the optical WG channel 220. In this case, the integrated-optic device 200 would be functioning as an equalizer that is operational when a voltage signal is being applied to terminal 221 and that is non-operational when the voltage signal is not being applied to terminal 221. If the fractions of light of wavelengths $\lambda_1$, $\lambda_2$ and $\lambda_3$ that arrive at the output of the optical WG channel 220 do not need to be equal, then applying the voltage signal to terminal 221 would simply result in the device 200 functioning as an attenuator for wavelengths $\lambda_1$, $\lambda_2$ and/or $\lambda_3$.

Rather than having three different DBGs 232, 233 and 234 formed in the device 200 as shown in FIG. 3, a single "chirped" DBG could be formed in the device 200. A chirped DBG is a single DBG having a period that changes to enable the DBG to react to different wavelengths of light. For example, if the DBG 30 shown in FIG. 1 was a chirped DBG, the spacing between adjacent refractive index layers 231 would not be constant. An array of devices, such as the device 200 shown in FIG. 3, each having a chirped DBG formed therein could be used to provide equalization over a continuous range of wavelength channels simultaneously.

Figure 4:
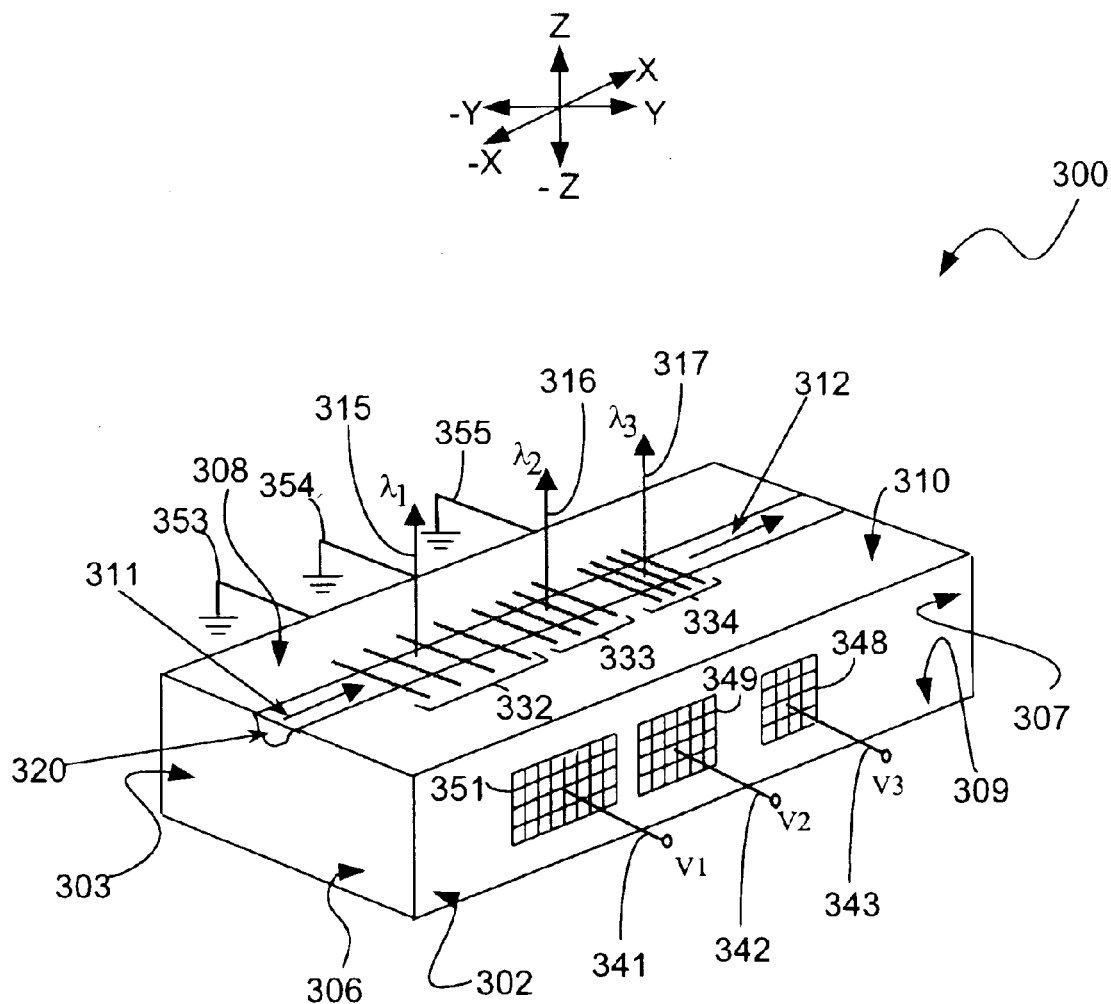
FIG. 4 is a perspective view of the integrated-optic device of the present invention that demonstrates yet another example embodiment in which light coupled into the optical WG channel is equalized for multiple wavelengths of light.

FIG. 4 demonstrates another example of the manner in which an integrated-optic device 300 of the present invention can be configured to perform channel-to-channel equalization. In this example embodiment, each of the DBGs 332, 333 and 334 can be separately modulated. Each voltage terminal 341, 342 and 343 is connected to a respective conductive grid-like pattern 348, 349 and 351 on side 302 of the device 300. Likewise, the ground terminals 353, 354 and 355 are connected to respective conductive grid-like patterns (not shown) that are similar to grids 351, 349 and 348 on side 303 of the device 300. These grid-like conductive areas allow electric fields to be set up in the material of the substrate 310 such that the electric fields applied to each DBG 332, 333 and 334 can be individually modulated. In this way, the fraction of each wavelength of light that is allowed to propagate to the output of the optical WG channel 320 can be precisely controlled. Therefore, by applying voltage signals to the terminal 341, 342 or 343, the fractions of light of the wavelengths associated with the DBGs 332, 333 and 334, respectively, that are allowed to propagate through the WG channel 320 to the output thereof can be made equal. Since the modulation of the DBGs 332, 333 and 334 is separately controllable, the voltage signals applied to the terminals 341, 342 and 343 can be varied to ensure that the fractions of light of the wavelengths associated with the DBGs 332, 333 and 334 that reach the output of the optical WG channel 320 are equal.

The arrows 315, 316 and 317 in FIG. 4 represent light reflected by DBGs 332, 333 and 334, respectively, out of the WG channel 320. In accordance with this example, if only DBG 332 is modulated, a fraction of light of wavelength $\lambda_1$ will be coupled out of the WG channel 320, as indicated by arrow 315, and a fraction of light of wavelength $\lambda_1$ and all light of wavelengths $\lambda_2$ and $\lambda_3$ will pass through grating sets 332, 333 and 334 to the output of the WG 20, as represented by arrow 312. Some fraction of light of wavelength $\lambda_1$ may also be retro-reflected back toward the input of the WG channel 320. Likewise, if only DBG 333 is modulated, a fraction of light of wavelength $\lambda_2$ will be coupled out of the WG channel 320, as indicated by arrow 316, and a fraction of light of wavelength $\lambda_2$ and all light of wavelengths $\lambda_1$ and $\lambda_3$ will pass through grating sets 332, 333 and 334 to the output of the WG 320, as represented by arrow 312. Some fraction of light of wavelength $\lambda_2$ may also be retro-reflected back toward the input of the WG channel 320. Likewise, if only DBG 334 is modulated, a fraction of light of wavelength $\lambda_3$ will be coupled out of the WG channel 320, as indicated by arrow 317, and a fraction of light of wavelength $\lambda_3$ and all light of wavelengths $\lambda_1$ and $\lambda_2$ will pass through DBGs 332, 333 and 334 to the output of the WG 320, as represented by arrow 312. Some fraction of light of wavelength $\lambda_3$ may also be retro-reflected back toward the input of the WG channel 320.

It should be noted that the present invention is not limited with respect to the location, shape and size of the electrodes and the techniques used to create them. For example, although the embodiment of FIGS. 2, 3 and 4 show electrodes and conductive grid-like patterns located on the side surfaces of the substrate. Alternatively, the conductive elements needed for generating the electric field could be placed on, for example, upper and lower surfaces of the substrate. Alternatively, conductive elements for generating the electric field could be placed directly in contact with the DBG(s) in the form of conductive traces that allow a voltage to be applied directly to the DBG(s) rather than to a surface of the material, as discussed below with respect to the example embodiment of FIG. 5.

The conductive elements used to generate the electric field may be, for example, vapor deposited on surfaces of the substrate or, alternatively, formed as conductive traces within or on the substrate. The area of each of the conductive grid-like patterns shown in FIGS. 2–4 in the z, y plane should be at least as large as the area of the respective DBG intended to be modulated via two opposing conductive grid-like patterns. This allows an electric field distribution to be provided that influences the performance of the DBG in an optimal fashion. Conductive elements for generating the electric field that have cross-sectional areas smaller than this may not produce optimum out-coupling effects.

Figure 5:
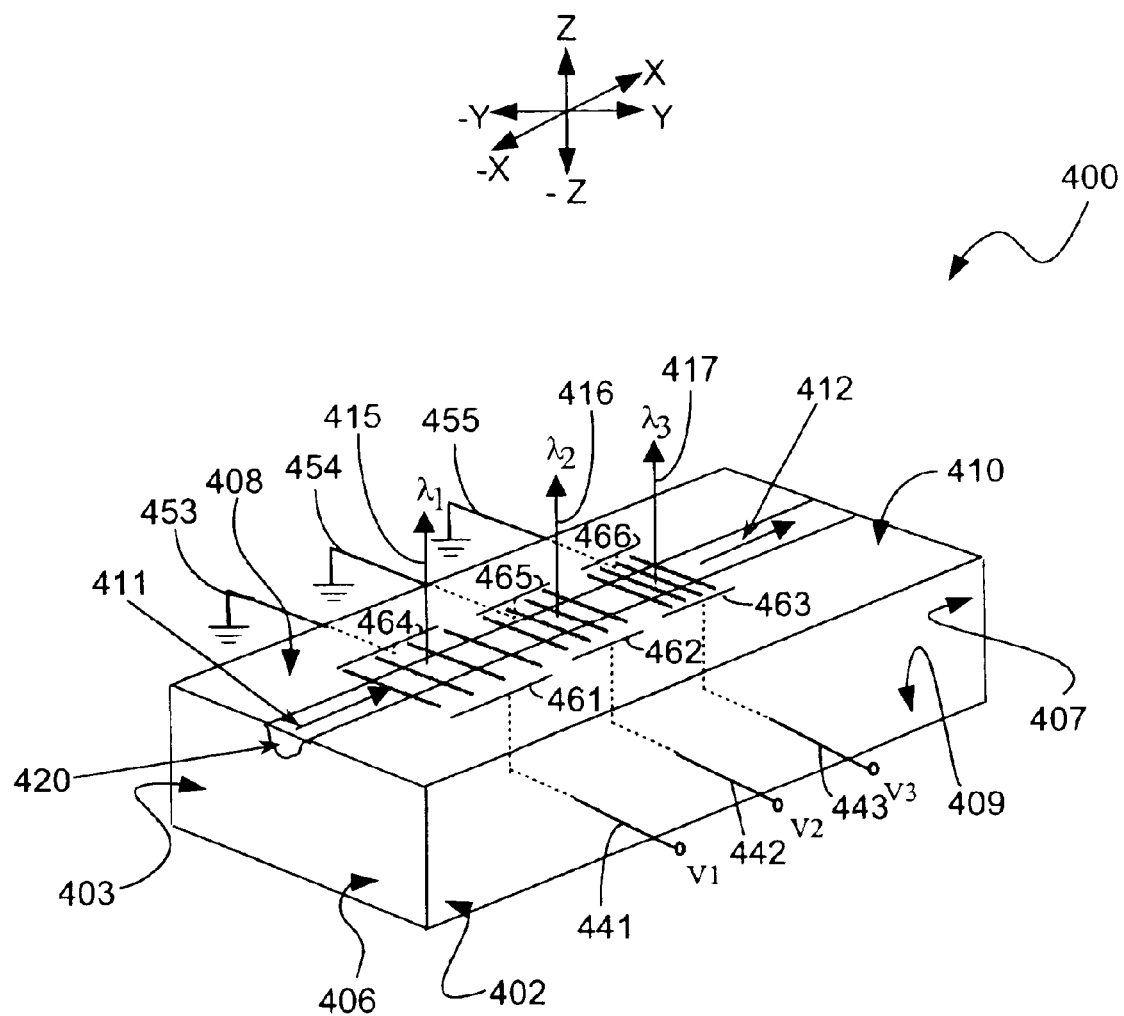
FIG. 5 is a perspective view of the integrated-optic device of the present invention that demonstrates yet another example embodiment in which light coupled into the optical WG channel is equalized for multiple wavelengths of light.

FIG. 5 illustrates another example embodiment of the integrated-optic device 400 of the present invention in which conductive elements 461, 463 and 463, which may be, for example, conductive traces, are conductively connected to terminals 441, 442 and 443, respectively. Similarly, ground terminals 453, 454 and 455 are conductively connected to conductive elements 464, 465 and 466, respectively. The conductive elements 461–466 are in contact with the portions of the substrate material in which the DBGs actually exist, as indicated by the proximity of the conductive elements 461–466 to the respective DBGs, FIG. 5 is merely a pictorial representation of this form of connection and is not intended to schematically illustrate the manner in which conductive trace patterns might actually be formed in the substrate 410 for this purpose. Those skilled in the art will understand, in view of the discussion provided herein, the manner in which conductive elements having a variety of configurations may be formed in the substrate, or otherwise secured to the substrate in some suitable fashion, to enable the appropriate electric fields to be generated to modulate one or more of the DBGs.

Preferably, the material comprising the substrate allows information that is holographically stored in the substrate to be erased and new information to be written into the substrate. The DBG(s) originally formed in the substrate will be preserved for at least some period of time, i.e., the substrate stores the DBG(s) for some period of time. The DBG(s) can be erased by, for example, uniformly exposing the substrate to light at a particular wavelength (e.g., ultraviolet light) and/or by subjecting the substrate 10 to elevated temperatures. Materials are known that are capable of preserving a DBG for some period of time, or until the DBG is erased, and that are capable of being re-written with a new DBG.

Although it is not a requirement of the present invention that the material used for the substrate be capable of being re-written, it is beneficial to use a material that is capable of being re-written, because doing so enables the integrated-optic attenuation/equalizer device to be programmed and re-programmed to be effective for different wavelengths of light. However, even an integrated-optic attenuation/equalizer device that cannot be re-programmed by re-writing a new DBG(s) to it is useful for the wavelength or bandwidth of light for which it was originally created. The re-writability of the substrate merely adds further advantages to the present invention by providing the integrated-optic attenuation/equalizer device 1 with greater versatility and flexibility.

The present invention has been described with reference to certain preferred and example embodiments. The present invention is not limited to the embodiments described above, as will be understood by those skilled in the art from the discussion provided herein. The manner in which the integrated-optic attenuator/equalizer device of the present invention functions depends on a large number of parameters, including the material used as the substrate, the wavelength(s) of light upon which the device operates, the number and order of grating(s) comprised in the device, the manner in which the grating(s) are formed in the substrate (e.g., the type of exposure used to create the grating(s)), the refractive indices involved, the manner in which the DBGs are modulated, etc. Also, the description provided herein of modulating the DBG(s) via an electric field was used only for example purposes. As stated above, the substrate material selected could alternatively be a material that is capable of being subjected to thermal or acoustical signals to enable the DBG(s) to be thermally or acoustically modulated. Those skilled in the art will understand the manner in which these and other parameters can be selected to create the desired attenuation/equalization effect.

What is claimed is:

1. An integrated-optic device comprising:
a photorefractive substrate;
at least one optical waveguide channel formed in the substrate, the waveguide channel having an input for receiving light coupled into the integrated-optic device and an output through which at least a fraction of the received light propagates;
a first diffractive-Bragg grating formed in said substrate, the first diffractive-Bragg grating intersecting said optical waveguide channel; and
a diffractive-Bragg grating modulator, the diffractive-Bragg grating modulator configured to modulate the first diffractive-Bragg grating, wherein modulating said first diffractive-Bragg grating by said diffractive Bragg grating modulator causes at least a fraction of the light coupled into the input of the waveguide channel to be coupled out of the waveguide channel at a location other than the input or output of the waveguide channel.

2. The integrated-optic device of claim 1, wherein the diffractive-Bragg grating modulator comprises an electric field generator, the photorefractive material of the substrate has electro-optic properties, and the electric field generator is capable of generating an electric field that modulates said diffractive-Bragg grating by modulating the electro-optic properties of the substrate.

3. The integrated-optic device of claim 1, wherein the diffractive-Bragg grating modulator comprises a thermal modulator capable of generating a temperature gradient that modulates said at least one diffractive-Bragg grating.

4. The integrated-optic device of claim 1, wherein the diffractive-Bragg grating modulator comprises an acoustical modulator capable of generating acoustic signals that acoustically modulate said diffractive-Bragg grating.

5. The integrated-optic device of claim 1, wherein the integrated-optic device is an integrated-optic attenuator device, and wherein the modulation of said diffractive-Bragg grating operates to attenuate the light coupled into the optical waveguide channel by preventing at least a fraction of the light coupled into the optical waveguide channel from propagating through the output of the optical waveguide channel.

6. The integrated-optic device of claim 1, wherein the diffractive Bragg grating is a first diffractive Bragg grating, and the integrated optic device additionally comprises a second diffractive-Bragg grating fanned in said substrate, each of said diffractive-Bragg gratings intersecting said optical waveguide channel, the first diffractive-Bragg grating having a first wavelength $\lambda_1$ of light associated therewith, the second diffractive-Bragg grating having a second wavelength $\lambda_2$ of light associated therewith, wherein when the first diffractive-Bragg grating is not modulated, the first diffractive-Bragg grating is transmissive to at least a fraction of light of wavelength $\lambda_1$, and wherein when the first diffractive-Bragg grating is modulated, the first diffractive-Bragg grating prevents at least a fraction of light of wavelength $\lambda_1$ from propagating through the output of the optical waveguide channel, and wherein when the second diffractive-Bragg grating is not modulated, the second diffractive-Bragg grating is transmissive to at least a fraction of light of wavelength $\lambda_2$, and wherein when the second diffractive-Bragg grating is modulated, the second diffractive-Bragg grating prevents at least a fraction of light of wavelength $\lambda_2$ from propagating through the output of the optical waveguide channel.

7. The integrated-optic device of claim 6, wherein the integrated-optic device is an integrated-optic attenuator device that attenuates light of wavelengths $\lambda_1$ and $\lambda_2$ when the first or second diffractive-Bragg gratings, respectively, are modulated to prevent the at least fractions of light of wavelengths $\lambda_1$ and $\lambda_2$ from propagating through the output of the optical waveguide channel.

8. The integrated-optic device of claim 6, wherein the integrated-optic device is an integrated-optic equalizer device, and wherein the flint and second diffractive-Bragg gratings are modulated to equalize the fractions of the light of wavelengths $\lambda_1$ and $\lambda_2$ that propagates through the output of the optical waveguide channel.

9. The integrated-optic device of claim 6, wherein at least a fraction of the light is coupled out of the optical waveguide channel by the first or second diffractive-Bragg gratings.

10. The integrated-optic device of claim 6, wherein at least a fraction of the light is retro-reflected by the first or second diffractive-Bragg gratings.

11. The integrated-optic device of claim 6, wherein the manlier in which the first and second diffractive-Bragg gratings are modulated can be dynamically varied by controllably varying the diffractive-Bragg grating modulator.

12. The integrated-optic device of claim 6, wherein the first and second diffractive-Bragg gratings are simultaneously modulated and wherein the manner in which the first and second diffractive-Bragg gratings are modulated can be dynamically varied by controllably varying the diffractive-Bragg grating modulator.

13. The integrated-optic device of claim 6, wherein the first and second diffractive-Bragg gratings are separately modulated by the diffractive-Bragg grating modulator, and wherein the manner in which the first and second diffractive-Bragg gratings are modulated can be dynamically varied by controllably varying the diffractive-Bragg grating modulator.

14. The integrated-optic device of claim 13, wherein, by dynamically varying the manner in which the first and second diffractive-Bragg gratings are modulated, the fractions of light of wavelengths $\lambda_1$ and $\lambda_2$ that propagate through the output of said at least one optical waveguide channel are dynamically varied.

15. The integrated-optic device of claim 1, wherein the integrated-optic device is re-configurable by erasing said at least one diffractive-Bragg grating formed therein and by forming at least one other diffractive-Bragg grating in the substrate by exposing the substrate to a particular interferometric picture.

16. A method of operating on light input to art integrated-optic device, the method comprising the steps of:
  providing the integrated-optic device comprising a substrate having an optical waveguide channel and a diffractive-Bragg grating formed therein, the substrate comprising photorefractive material, the waveguide channel having an input for receiving light coupled into the integrated-optic device and an output through which at least a fraction of the received light propagates;
  coupling light into the input of the optical waveguide channel such that the light propagates through said optical waveguide channel and impinges on said diffractive-Bragg grating formed in said substrate;
  modulating said diffractive-Bragg grating to cause at least a fraction of the light coupled into the input of the waveguide channel to be coupled out of the waveguide channel at a location other than the input or output of the waveguide channel.

17. The method of claim 16, wherein the integrated-optic device is an integrated-optic attenuator device, and wherein modulating said diffractive-Bragg grating attenuates the light coupled into the optical waveguide channel by preventing at least a fraction of the light coupled into the optical waveguide channel from propagating through the output of the optical waveguide channel.

18. The method of claim 16, wherein the diffractive-Bragg grating is a first diffractive Bragg grating, the integrated-optic device additionally comprises a second diffractive-Bragg grating are fanned in said substrate, the first diffractive-Bragg grating having a first wavelength $\lambda_1$ of light associated therewith, the second diffractive-Bragg grating having a second wavelength $\lambda_2$ of light associated therewith, wherein when the first diffractive-Bragg grating is not modulated, the first diffractive-Bragg grating transmits at least a fraction of light of wavelength $\lambda_1$, and wherein when said first diffractive-Bragg grating is modulated, the first diffractive-Bragg grating preventS at least a fraction of light of wavelength $\lambda_1$ from propagating through the output of the optical waveguide channel, and wherein when said second diffractive-Bragg grating is not modulated, the second diffractive-bragg grating transmits at least a fraction of light of wavelength $\lambda_2$ and wherein when said second diffractive-Bragg grating is modulated, the second diffractive-Bragg grating prevents at least a fraction of light of wavelength $\lambda_2$ from propagating through the output of the optical waveguide channel.

19. The method of claim 18, wherein the fractions of light of wavelengths $\lambda_1$ and $\lambda_2$ that propagate through the output of the optical waveguide channel are at least substantially equal.

20. The method of claim 18, wherein the fractions of light of wavelengths $\lambda_1$ and $\lambda_2$ that propagate through the output of said optical waveguide channel are unequal.

21. The method of claim 18, wherein the first and second diffractive-Bragg gratings are modulated by subjecting the first and second diffractive-Bragg gratings to an electric field, and wherein the substrate has electro-optic properties.

22. The method of claim 21, wherein the electric field to which the first and second distributed Bragg gratings are subjected can be varied, and wherein varying the electric field causes the fractions of light of wavelengths $\lambda_1$ and $\lambda_2$ that arrive at the output of said at least one optical waveguide channel t be dynamically varied.

23. The method of claim 16, wherein the first and second diffractive-Bragg gratings are modulated via thermal modulation.

24. The method of claim 16, wherein the first and second diffractive-Bragg gratings are modulated via acoustical modulation.

25. The method of claim 16, wherein the integrated-optic device is reconfigurable by erasing said at least one diffractive-Bragg grating formed in said substrate and by forming at least one other diffractive-Bragg grating in the substrate by exposing the substrate to a particular interferometric picture.

* * * * *